Figure 1:
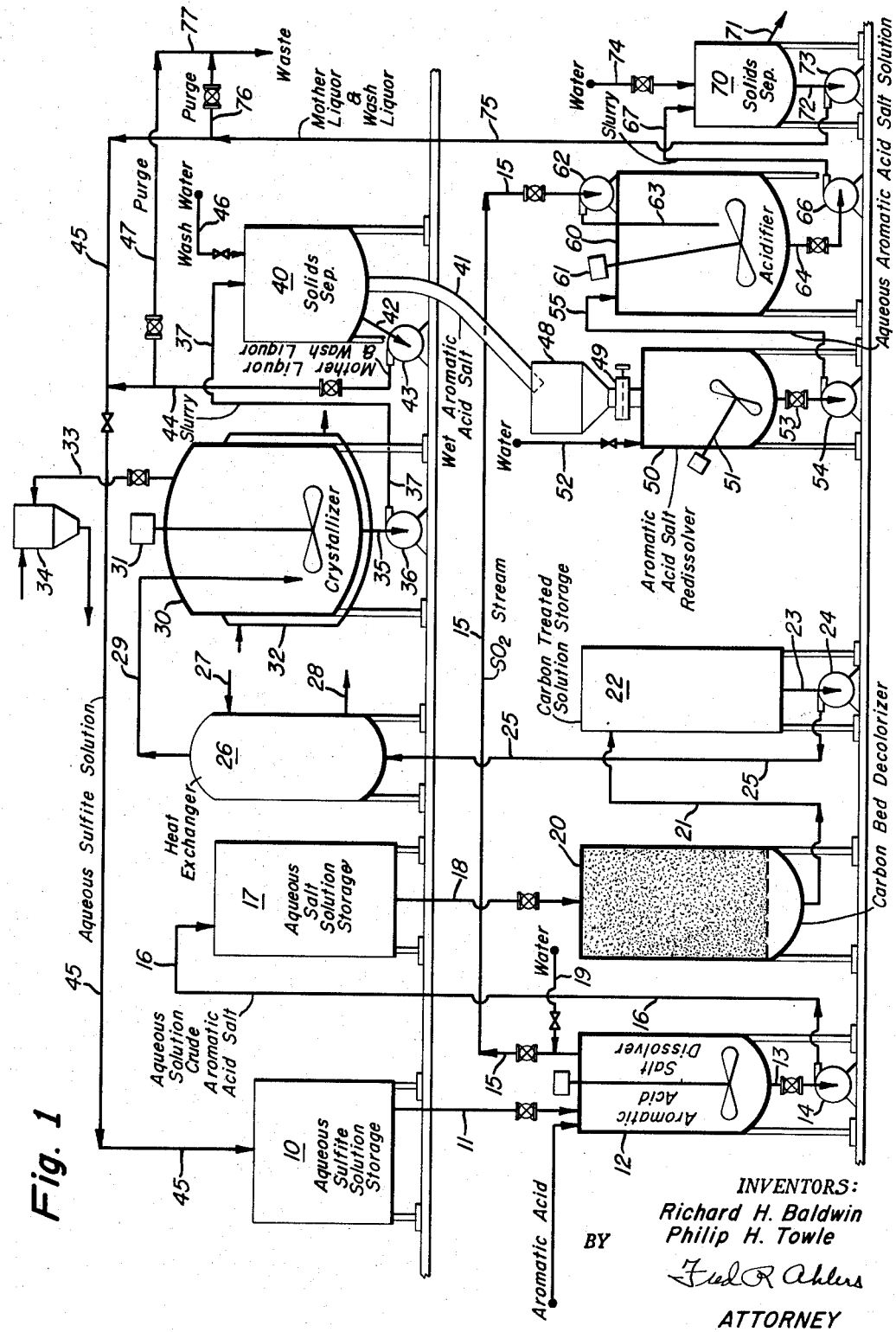

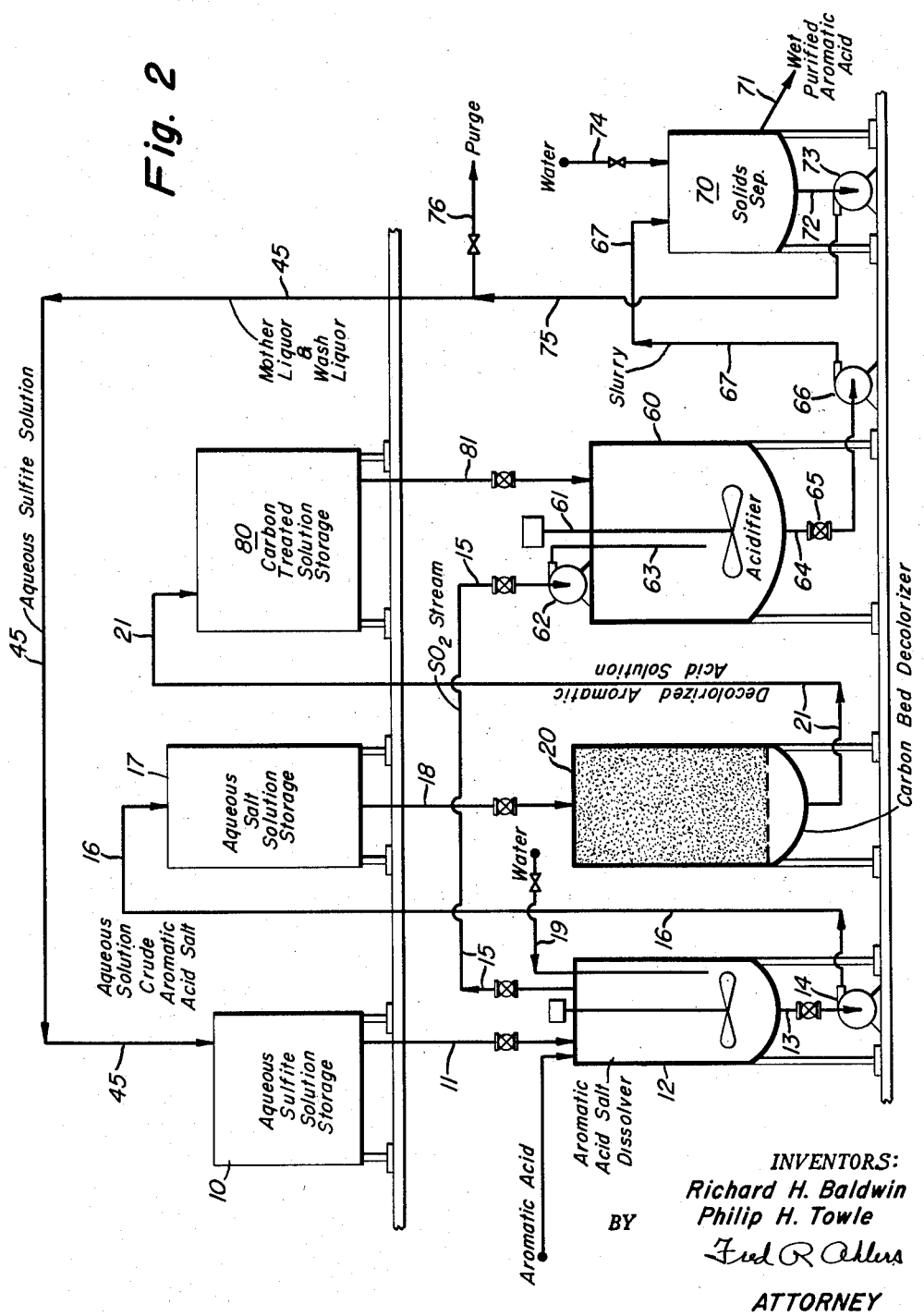

United States Patent Office 3,095,445
Patented June 25, 1963

3,095,445
CYCLIC PROCESS FOR REUSE OF SULFUR DIOXIDE IN THE PURIFICATION OF AROMATIC DICARBOXYLIC ACIDS
Richard H. Baldwin and Philip H. Towle, Chicago, Ill., assignors to Standard Oil Company, Chicago, Ill., a corporation of Indiana
Filed July 16, 1959, Ser. No. 827,660
7 Claims. (Cl. 260—515)

This invention relates to the purification of aromatic polycarboxylic acids and more specifically pertains to a cyclic process for recovery of aromatic polycarboxylic acids purified through the treatment of aqueous solutions of salts of aromatic polycarboxylic acids by springing the aromatic polycarboxylic acid from said solution with sulfur dioxide by a process wherein the sulfur dioxide can be recycled.

Several processes have been developed for the purification of aromatic polycarboxylic acids through treatment of aqueous solutions of water-soluble salts of the aromatic polycarboxylic acids. One process is for the removal of such metal ions as iron, nickel and/or cobalt by treating at 40 to 60° C. an aqueous solution of sodium terephthalate with sodium hypochlorite and separating the precipitated form of the metals from the aqueous solution. Another involves treating an aqueous solution of a water-soluble salt of the aromatic polycarboxylic acid with a hypohalite, crystallizing the polycarboxylic acid salt from solution with a highly ionized water-soluble salt by common ion effect, washing the crystallized salt with an aqueous solution saturated with the highly ionized salt, redissolving the washed polycarboxylic acid salt and regenerating the aromatic polycarboxylic acid. A third involves passing an aqueous solution of a water-soluble salt of the aromatic polycarboxylic acid through a bed of activated carbon or charcoal to remove colored or color-forming impurities as well as closely related organic impurities and then regenerating the aromatic polycarboxylic acid. Still another involves oxidation of the aqueous solution before passing it through a bed of activated carbon or charcoal. There is also the method for removal of sulfur and ammonia by first steam stripping an aqueous solution of the ammonium salt of the aromatic polycarboxylic acid, filtering to remove precipitated sulfur, reacting this solution with sodium hydroxide to convert the ammonium salt to the sodium salt, then steam stripping ammonia from the solution, and slurrying the resulting dilute aqueous solution with carbon to remove color bodies. All of these purification processes produce an aqueous solution of a water-soluble salt of an aromatic polycarboxylic acid from which the polycarboxylic acid must be regenerated.

The preferred method for regenerating the aromatic polycarboxylic acid from its salt in aqueous solution is to acidify the solution. Such acidic materials as benzoic acid, hydrochloric acid, sulfuric acid, carbonic acid or carbon dioxide, sulfurous acid or sulfur dioxide and the like have been proposed. The use of benzoic acid is limited to a process wherein an alkali metal, generally potassium, terephthalate is in solution for potassium benzoate is formed when terephthalic acid is regenerated and potassium benzoate is converted to potassium terephthalate by disproportionation. When hydrochloric acid or sulfuric acid is employed to spring the aromatic polycarboxylic acid from solution, the acid anion, chloride or sulfate, becomes a part of a highly ionizable salt in solution from which either acid, hydrochloric acid or sulfuric acid, is not readily regenerated. The use of carbonic acid or carbon dioxide requires high pressure equipment and a multi-step springing process. For example, terephthalic acid is regenerated from an aqueous solution of its sodium salt at high pressures by first forming monosodium acid terephthalate and reacting the latter with further quantities of $CO_2$ under high pressure. The by-product sodium carbonates in aqueous solution can be recycled to dissolve further quantities of terephthalic acid as the water-soluble disodium salt, but the liberated $CO_2$ must be compressed to the high pressures used in the springing step. Thus, benzoic acid is limited in use as an acidifying agent, hydrochloric acid and sulfuric acid do not lend themselves readily to use in a cyclic process, and carbon dioxide is not an acidifying agent which is readily adaptable to a simple cyclic process.

It has been discovered that sulfur dioxide or sulfurous acid is an acidifying agent which can be readily adapted to a commercial purification process to spring or regenerate an aromatic polycarboxylic acid from an aqueous solution of its water-soluble salt where said solution is employed in a process for purifying the aromatic polycarboxylic acid. It is appreciated that sulfur dioxide has been suggested as an acidifying agent and that the resulting aqueous solution containing dissolved sulfites and bisulfites has been proposed as being useful to form salts of aromatic acids, generally benzoates for the disproportionation reaction hereinbefore described. However, no cyclic process comprising a combination of means for employing sulfur dioxide has been disclosed for a commercially feasible process for purifying aromatic polycarboxylic acids.

Briefly, the process of this invention comprises purifying an aromatic polycarboxylic acid including the steps of forming an aqueous solution of a water-soluble alkaline salt; i.e., sodium, potassium or ammonium salts, of the aromatic polycarboxylic acid, 25 to 100% of its saturation concentration in water, by reacting crude aromatic polycarboxylic acid with an aqueous solution containing water-soluble alkaline sulfites while removing the $SO_2$ liberated. The aqueous solution of the alkaline aromatic polycarboxylic acid is decolorized. An aqueous solution of the decolorized water-soluble aromatic polycarboxylic acid is acidified to a pH in the range of 1 to 2 under a slight pressure employing the sulfur dioxide liberated in the dissolving step, thereby regenerating the aromatic polycarboxylic acid and forming a solution of alkaline sulfites. The regenerated aromatic polycarboxylic acid is separated from the aqueous solution. The aqueous solution of alkaline sulfites is recycled to the step of dissolving the crude aromatic polycarboxylic acid.

The above process is exceptionally useful for the purification of crude phthalic acids having no ortho-oriented carboxylic acid groups; i.e., terephthalic acid and isophthalic acid. For these aromatic polycarboxylic acids, the purification of the aqueous solution of water-soluble alkaline salts should include at least passing said aqueous solution through a bed of activated carbon or charcoal. Merely slurrying with activated carbon or charcoal does not produce adequate purification. Also, the solution passed through the bed of activated carbon should have a pH in the range of 6 to 7 and preferably in the range of 6.3 to 6.7. When terephthalic acid of high aldehydic acid content, above about 1.0%, is being purified, it is preferred that, prior to passing the solution of its salt through the carbon bed, the aqueous solution of alkaline terephthalate be subjected to an alkaline oxidation step with either an alkali metal hypohalite, preferably hypochlorite, or permanganate to obtain a purified product of aldehydic acid content of 0.5% or less. However, the alkaline oxidation can be replaced with a crystallization step following carbon treatment when the crude terephthalic acid has a low initial color and/or low aldehydic acid content as hereinafter defined. Crystallization can be accomplished by salting out or by evaporative cooling which is preferred.

Terephthalic acid to be acceptable for use in preparing high molecular weight polyester and polyamide derivatives should have a TEG Color of less than 250, desirably below 150 and preferably in the range of 50 or less to 150. The purified terephthalic acid should have a 4-carboxybenzaldehyde content of less than 0.10%, desirably below 0.05% and preferably in the range of 0.01 to 0.05%. Isophthalic acid of high purity should have a TEG Color of less than 150, desirably below 100 and preferably in the range of 20 to 50. The 3-carboxybenzaldehyde content should also be below 0.10%, desirably below 0.05% and preferably be in the range of 0.01 to 0.05%. The TEG Color is determined by reacting 4 grams of aromatic polycarboxylic acid and 28.5 ml. triethylene glycol at 500° F. with nitrogen purge. The liquid reaction product is cooled to room temperature, diluted with isopropyl alcohol 1:1 and the color of the dilute solution is compared with APHA (Hagen platinum-cobalt colors) standards with a Fisher electrophotometer using a 650μ red filter and a 425μ blue filter. The "TEG Color" is, therefore, an APHA color. Acceptable terephthalic acid for direct conversion to bis-glycol terephthalate for the preparation of polyethylene terephthalate should have a "TEG Color" of less than 150, desirably less than 100 and preferably 60 or less.

The process of this invention being most useful in the purification of crude terephthalic acid and crude isophthalic acid is described in greater detail with respect to the purification of these acids.

With crude terephthalic acid having an initial 4-carboxybenzaldehyde content in the range of about 1.7 to 1.2 or below and a TEG Color of 700 to 500 or below or a crude isophthalic acid having an initial 3-carboxybenzaldehyde content of about 1% or below and a TEG Color of 300 to 200 or below the alkaline oxidation step can be omitted before carbon treatment and a crystallization after carbon treatment is substituted as above described. Such a process is described in detail with respect to the process illustrated in the schematic flow sheet illustration of FIG. 1 wherein the principal process steps are carried out employing aqueous liquor recycle storage tank 10, crude aromatic acid dissolver 12, sulfur dioxide valved conduit 15, carbon bed 20, crystallizer 30, redissolver 50, sulfur dioxide acidification vessel 60, sulfite solution recycle conduit 75 and transfer conduit 45.

With respect to one embodiment of the process of this invention and with reference to FIG. 1, there is added to crude aromatic acid dissolver 12, 100 pounds of a crude terephthalic acid containing about 2% 4-carboxybenzaldehyde and having a TEG Color of 670. From aqueous liquor recycle storage tank 10 through valved conduit 11 there are withdrawn 1092 pounds of aqueous solution containing 97 pounds sodium bisulfite; said solution also contains 200 pounds of mother liquor and 100 pounds of water wash liquor from separator 40. Also charged to dissolver 12 are 10 pounds of sodium hydroxide and 2160 pounds of water added through valved supply line 19. Crude aromatic acid dissolver 12 is closed, sulfur dioxide valved conduit 15 is opened and centrifugal blower 62 is started. The mixture in dissolver 12 is heated with stirring to about 100° C. The liberated sulfur dioxide is taken through valved conduit 15 by centrifugal blower 62 to acidification vessel 60 containing an aqueous solution of redissolved disodium terephthalate obtained as hereinafter described. After the liberation of sulfur dioxide from crude aromatic acid dissolver 12 has substantially ceased, its valved transfer line 15 is closed and centrifugal blower shut off. The hot aqueous solution of disodium terephthalate is withdrawn from crude aromatic acid dissolver 12 by pump 14 and transferred through conduit 16 to crude aromatic acid salt solution storage 17. Crude aromatic acid dissolver is then recharged.

The aqueous solution of the disodium salt of crude terephthalic acid is withdrawn from aromatic acid salt storage 17 through valved conduit 18 to flow through activated carbon bed 20 at a rate to provide a contact time of 1 to 60 minutes, desirably 15 to 45 minutes and preferably about 25 to 35 minutes at a carbon to terephthalic acid equivalent ratio in the range of about 2:1 to 200:1, desirably 2:1 to 80:1 and preferably 5:1 to 20:1. It is preferred that the activated carbon be granular; i.e., in the particle size range of 4 to 100 mesh. The activated carbon treated solution flows through transfer conduit 21 to carbon treated solution storage tank 22 from which it is taken through discharge conduit 23 by pump 24 and passed through transfer conduit 25 to heat exchanger 26 wherein the aqueous solution is heated to about 125°–150° C. The heated carbon treated aqueous solution flows into crystallizer 30 wherein water is evaporated at reduced pressure, preferably down to 70 to 80 mm. Hg, to remove about 2800 pounds of water per 100 pounds of crude terephthalic acid equivalent and to reduce the temperature of the concentrate to about 35–45° C. Heat can be added to crystallizer 30, for example, through jacket 32 or by employing internal heating coils as required to regulate the amount of solvent vaporized. Disodium terephthalate, about 98 pounds, crystallizes leaving about 200 pounds of a saturated solution, about 12.8 pounds of disodium terephthalate per 100 pounds of solution. The resulting slurry, about 32.8% solids, is taken through discharge 35 by slurry pump 36 and charged through slurry transfer line 37 to solids separator 40 which may be a filter press, a centrifugal filter, a filter drum or any other means for separating solids and liquids. The separated mother liquor discharges through discharge line 42 and is taken by pump 43, and passed through valved conduit 44 and transfer conduit 45 to aqueous recycle storage tank 10. If desired or necessary a portion of the mother liquor can be purged through valved purge conduit 47 to waste line 77.

The solids recovered in solids separator 40 are washed with water. The wash water is, like the mother liquor, sent to aqueous recycle storage tank 10. The washed recovered solids are discharged from separator 40 through solids transfer conduit 41 to redissolver 50, for example, by collecting first in salt hopper 48 a measured amount of disodium terephthalate for redissolving and then dropped into redissolver 50 by opening slide valve 49. Redissolver 50 contains for each 100 pounds of crude terephthalic acid originally charged sufficient water to dissolve the disodium terephthalate at about 25 to 30° C. A wet cake of 130 pounds containing about 25% water will require about 685 pounds of water added through valved conduit 52 to form a 12% disodium terephthalate solution at 25° to 30° C. with stirring. The redissolved disodium terephthalate is taken through valved discharge 53 by pump 54 and charged through valved transfer line 55 to acidification vessel 60 at the time of or just before the preparation of a new solution of disodium salt of crude terephthalic acid in crude aromatic acid dissolver 12 so that the sulfur dioxide liberated therein can be utilized to spring purified terephthalic acid from the solution in acidification vessel 60. Terephthalic acid is preferably sprung at a pH of from 1 to 2. Additional makeup $SO_2$ can be added to acidification vessel 60. Springing and crystallization of purified terephthalic acid are preferably accomplished with stirring which also keeps the precipitate in suspension for removal through valved slurry discharge conduit 64 by pump 66 which passes the slurry through slurry feed conduit 67 to solids separator 70. Solids separator may be any one of the types employed as solids separator 40. The bisulfite mother liquor is taken through discharge line 72 by pump 73 and passed through bisulfite solution recycle conduit 75 to valved transfer conduit 45 and thence to aqueous recycle storage tank 10. A purge of bisulfite mother liquor may be removed through valved conduit 76 to waste line 77. Water to wash the solids in solids separator 70 is added through valved water line 74. The wash water is charged to aqueous recycle storage tank 10 as was the bisulfite mother liquor. The recovered, washed, purified terephthalic acid is removed from solids separator 70 through solids discharge 71 and dried.

By proper adjustment of size of apparatus and scheduling charging and springing the process as above described can be carried on continuously following dissolving of the crude acid to springing. By this embodiment of the process of this invention a terephthalic acid having a TEG Color of 120 to 100 or lower and a 4-carboxybenzaldehyde content of less than 0.05% can be obtained.

In place of crystallization of evaporative cooling, the disodium terephthalate can be salted out with sodium chloride by forming a solution of NaCl which is saturated at 25 to 30° C. and cooling the resulting solution of NaCl and disodium terephthalate to 25° to 30° C. In this case the mother liquor and the wash, saturated aqueous NaCl solution, taken from solids separator 40 are either discarded through valved conduit 47 or processed to recover the sodium chloride rather than collecting them in aqueous recycle storage tank 10. Also, the water not recycled will, of course, need to be added to dissolver 12. An additional modification comprises oxidizing the aqueous solution of the water-soluble salt of the aromatic acid with a hypohalite such as sodium hypochlorite per se or formed in situ or by oxidizing with potassium permanganate. Either of these alkaline oxidations can be carried out in crude aromatic acid dissolver 12, crude aromatic acid salt storage 17 or in carbon treated solution storage tank 22 with suitable means for separating any insoluble material formed. Also, in these modifications the mother liquor from separator 40 may be discarded or the mother liquor processed to remove sodium chloride to the level which will not interfere with the solubilizing of the crude aromatic acid from dissolver 12. Such modifications will produce a terephthalic acid of at least the purity above described.

By either of the processes described above isophthalic acid having a TEG Color of 300 to 200 with a 3-carboxybenzaldehyde content of 1.0% can be purified to a product having a TEG Color of 50 or less and a 3-carboxybenzaldehyde content of 0.05 or less.

In a second preferred embodiment of the process of this invention as illustrated in schematic drawing FIG. 2, where the crude aromatic acid to be purified has a lower aldehydic acid impurity content, say 0.1 to 0.5% by weight, certain of the steps associated with the process of FIG. 1 and modifications thereof as hereinbefore described can be omitted. In FIG. 2 there is shown such a modified process wherein the main process steps are carried out in dissolver 12 utilizing recycle aqueous liquors from aqueous recycle storage tank 10. Treatment of the resulting solution with activated carbon is conducted in carbon bed 20, collection of $SO_2$ is accomplished by $SO_2$ valved conduit 15 and centrifugal blower 62. Springing of the aromatic acid is accomplished in acidification vessel 60 and bisulfite is recycled for reuse in conduits 75 and 45.

More specifically, 100 pounds of crude terephthalic acid having a TEG Color of about 1100 and a 4-carboxybenzaldehyde content of about 0.5% are dissolved in crude aromatic acid dissolver 12 by mixing with recycle bisulfite liquor containing about 123 pounds of sodium bisulfite in water drawn from aqueous recycle storage tank 10 with the addition of sufficient water via valved conduit 19 to bring the total water to 2876 pounds to form an aqueous solution containing 4% disodium terephthalate by weight. Crude acid dissolver 12 is closed, the mixture is stirred and heated to about 90° to 100° C. with $SO_2$ valved conduit open and centrifugal blower 62 operating to spring terephthalic acid previously treated. When the liberation of $SO_2$ is substantially complete, the $SO_2$ valved conduit 15 is closed and centrifugal blower 62 is shut off. The resulting solution is pumped from crude acid dissolver 12 through valve discharge 13, pump 14 and transfer line 16 to crude acid salt solution storage 17. The solution is withdrawn therefrom through valved conduit 18, through activated carbon bed 20 to carbon treatment solution storage tank 80. The rate of carbon treatment and ratio of carbon to terephthalic acid equivalent are as hereinbefore disclosed. The carbon treated solution is withdrawn from storage tank 80 through valved conduit 81 to acidification vessel 60. The amount of solution charged to acidification vessel 60 is equal to the solution made up in crude acid dissolver 12. Dissolving of crude acid and charging of acidification vessel 60 can be scheduled so that the $SO_2$ liberated in crude acid dissolver 12 can be utilized to spring terephthalic acid in acidification vessel 60. Makeup $SO_2$ can be added to acidification vessel 60 to bring the pH of the solution to 1 to 2.

The resulting slurry of terephthalic acid is charged to solids separator 70. The bisulfite mother liquor is taken through discharge 72, pump 73, sulfite solution recycle conduit 75 and transfer conduit 45. Valved conduit 76 is provided for purge of bisulfite liquor if needed. The recovered terephthalic acid is washed with water and dried. By this process highly purified terephthalic acid having a TEG Color of 100 or less and a 4-carboxybenzaldehyde content of about 0.02% can be obtained.

The above specific embodiments illustrate the process of this invention for utilizing sulfur dioxide to spring purified aromatic polycarboxylic acids from aqueous solutions of their water-soluble alkaline salts and the handling of sulfur dioxide in a flowable state without resorting to liquidification and separate storage. Also, there is exemplified the utilization of the stored form of $SO_2$ for reuse in a form useful for the dissolving of the crude aromatic polycarboxylic acid.

The specific step of employing an activated carbon bed to remove organic impurities including color-imparting impurities from aqueous solutions of water-soluble alkaline salts of aromatic polycarboxylic acids is not a part of this invention, this being part of the invention of the copending application Serial No. 816,400, filed May 28, 1959. The specific combined effects of alkaline oxidation and treatment of the oxidized solution with activated carbon also are not part of this invention, for these are disclosed and claimed in copending application Serial No. 817,073, filed June 1, 1959. This application is, therefore, directed to the means for employing sulfur dioxide as an acidic springing agent and the utilization of the aqueous alkaline sulfite solution formed during springing to prepare the aqueous solution of the alkaline salt of an aromatic polycarboxylic acid for the purification of the aromatic polycarboxylic acid and the combination of these steps with the aforementioned purification steps of carbon treatment alone or with alkaline oxidation.

What is claimed is:

1. A cyclic process for the utilization of sulfur dioxide to liberate free terephthalic acid from its water-soluble alkaline salt in aqueous solution containing activated carbon purified water-soluble alkaline salt of terephthalic acid in a concentration in the range of 25–100% of its saturation concentration which comprises acidifying said aqueous solution to a pH in the range of from 1 to 2 by the addition of sulfur dioxide under pressure to said aqueous solution thereby liberating free terephthalic acid as a precipitate and forming an aqueous solution of alkaline sulfite, separating said aqueous solution of alkaline sulfite from the terephthalic acid precipitate, reacting at 90 to 100° C. said separated aqueous alkaline sulfite solution with terephthalic acid to form an aqueous solution of its water-soluble alkaline salt for activated carbon purification thereof and to liberate sulfur dioxide, and withdrawing and recycling the liberated sulfur dioxide under pressure to the acidification step.

2. The process of claim 1 wherein the alkaline sulfite solution is an aqueous solution of sodium bisulfite.

3. The process of claim 1 wherein the alkaline sulfite solution is an aqueous solution of potassium bisulfite.

4. A cyclic process for the removal of 4-carboxybenzaldehyde from crude terephthalic acid which process consists essentially of reacting at 100° C. a recycle aqueous solution of sodium bisulfite with an amount of crude terephthalic acid to form a solution of water-soluble crude sodium terephthalate in a concentration of from 25 to 100% of its saturation concentration in the water present in said aqueous sodium bisulfite solution thereby liberating sulfur dioxide, withdrawing the sulfur dioxide, percolating said aqueous solution of water-soluble sodium terephthalate through a bed of activated carbon at 125 to 150° C., crystallizing the sodium terephthalate from said carbon treated solution as a slurry of solid alkaline terephthalate in an aqueous medium, separating crystallized sodium terephthalate fraction and an aqueous mother liquor fraction from said slurry, redissolving the sodium terephthalate fraction in water to form a solution containing 12% sodium terephthalate at 25 to 30° C. acidifying said redissolved sodium terephthalate to a pH of 1 to 2 with said withdrawn sulfur dioxide under pressure to regenerate free terephthalic acid as a solid precipitate slurried in aqueous sodium bisulfite solution, separating from said slurry a solid terephthalic acid fraction and an aqueous sodium bisulfite solution fraction, recycling said aqueous sodium bisulfite solution fraction to the step of forming the solution of the sodium salt of crude terephthalic acid, and washing with water said terephthalic acid fraction.

5. The process of claim 4 wherein the mother liquor from the crystallization step is also recycled with the sodium sulfite solution.

6. The process of claim 4 wherein the aqueous solution of crude sodium terephthalate is subjected to oxidation with sodium hypochlorite.

7. A cyclic process for the purification of crude terephthalic acid whose impurity consists essentially of 4-carboxybenzaldehyde in an amount of from 0.1 to 0.5% which process consists essentially of reacting said crude terephthalic acid at 90 to 100° C. with aqueous sodium bisulfite to form an aqueous solution containing 4% disodium terephthalate and to liberate sulfur dioxide, withdrawing sulfur dioxide, percolating said 4% disodium terephthalate solution through activated carbon, acidifying said carbon treated solution to a pH of 1 to 2 with said withdrawn sulfur dioxide under pressure to regenerate free terephthalic acid as a solid precipitate slurried in aqueous sodium bisulfite solution, separating from said slurry a solid terephthalic acid fraction and an aqueous sodium bisulfite fraction, recycling said aqueous sodium bisulfite fraction to the step of forming the solution of disodium salt of crude terephthalic acid, and washing with water said terephthalic acid fraction.

References Cited in the file of this patent

UNITED STATES PATENTS

| 1,943,892 | Jaeger et al. | Jan. 16, 1934 |
| 2,879,291 | Elliot | Mar. 24, 1959 |

FOREIGN PATENTS

| C 9764 | Germany | Apr. 5, 1956 |
| 777,782 | Great Britain | June 26, 1957 |
| 788,276 | Great Britain | Dec. 13, 1957 |